Jan. 4, 1927.　　　　　　　　　　　　　　　　1,613,098
J. A. HARDING
SHOCK ABSORBER
Filed June 23, 1926　　　2 Sheets-Sheet 1
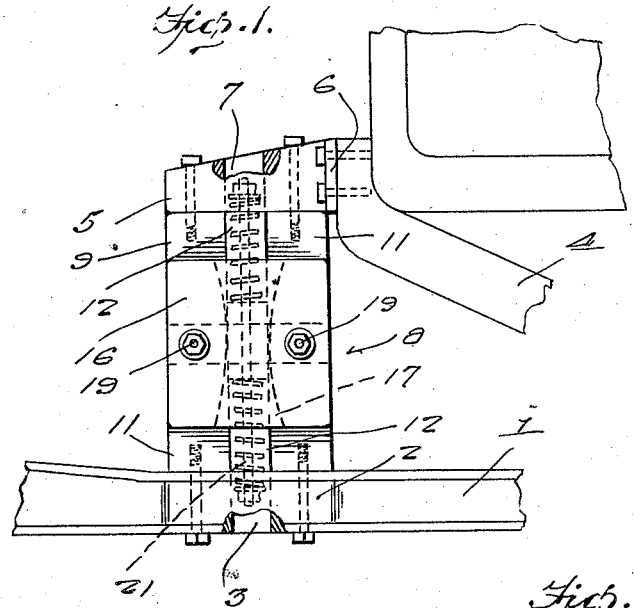
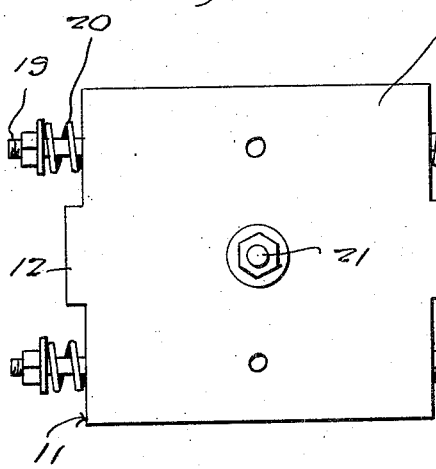
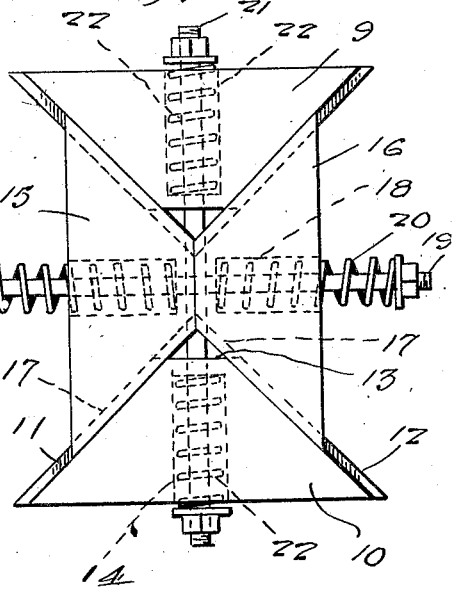
Inventor
John A. Harding
By Clarence A. O'Brien
Attorney Jan. 4, 1927. 1,613,098
J. A. HARDING
SHOCK ABSORBER
Filed June 23, 1926  2 Sheets-Sheet 2
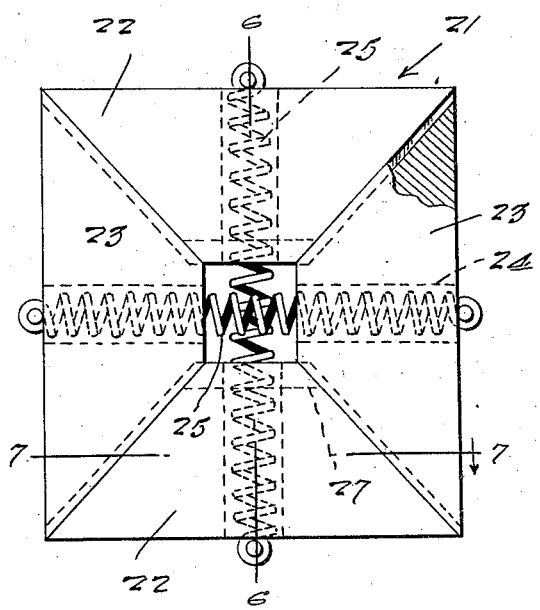
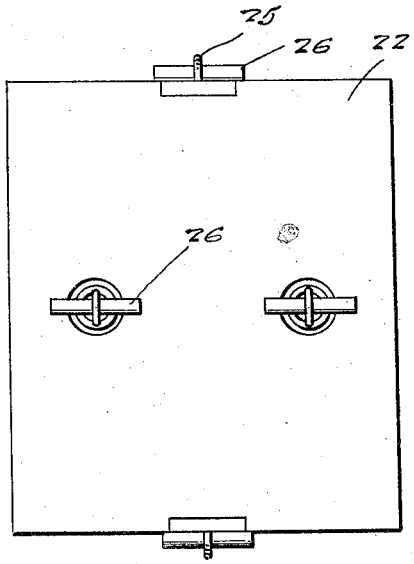
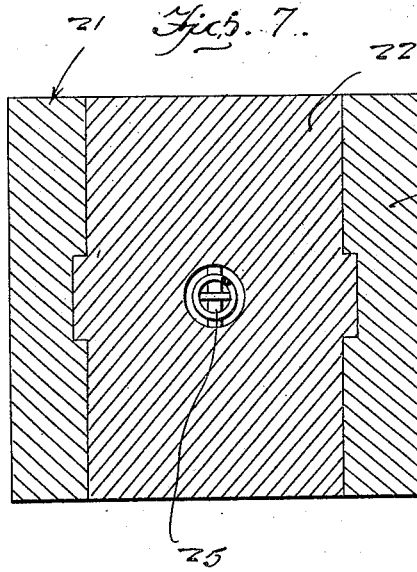
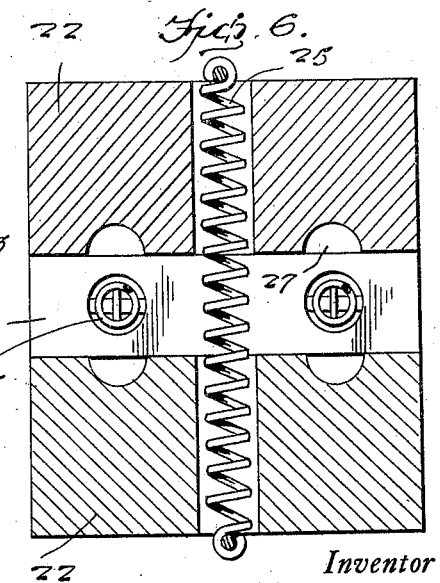
Inventor
John A. Harding
By Clarence A. O'Brien
Attorney Patented Jan. 4, 1927.

1,613,098

UNITED STATES PATENT OFFICE.

JOHN A. HARDING, OF TOLEDO, OHIO.

SHOCK ABSORBER.

Application filed June 23, 1926. Serial No. 118,014.

This invention relates to an improved vehicle shock absorber which is especially, but not necessarily adapted for disposition on an automobile between the chassis frame and one of the axles, although the device need not be employed totally in the capacity of a shock absorber, but may be used as a substitute for the usual spring construction.

Briefly, the invention has reference to a substantially rectangular body made up of a plurality of blocks having co-acting beveled faces and truncated apex portions, the blocks being so arranged as to provide for a cam action, which, together with an improved arrangement of spring devices serves to yieldably check violent jars and rebounds.

The invention is carried out in two slightly different embodiments which will be described in order so that the various features of construction and advantages will become more apparent as the description goes on.

In the accompanying drawings:—

Figure 1 is a fragmentary view of a portion of a vehicle showing the improved shock absorber associated therewith.

Fig. 2 is a side elevation of the improved shock absorber removed,

Fig. 3 is a top plan view of the same,

Fig. 4 is a side elevation of a different embodiment of the invention,

Fig. 5 is a top plan view of the structure shown in Fig. 4, and Figs. 6 and 7 are sections taken approximately upon the plane of the line 6—6 and 7—7 respectively of Fig. 4.

Attention is first invited to Figs. 1 to 3 inclusive, where one embodiment of the invention is shown. Here the reference character 1 designates, for instance, a front axle provided on opposite sides with outstanding portions 2 which serve a purpose to be hereinafter described. At the center, this axle is provided with an opening 3 which also serves in a manner to be described. The reference character 4 is employed to designate a part of the automobile chassis frame, and an attaching bracket 5 is connected with this, the bracket being in the form of a substantially rectangular plate having attaching flanges 6 and provided with an opening 7. The shock absorber in these figures is designated generally by the reference character 8, and this comprises a pair of top and bottom blocks 9 and 10 respectively. Inasmuch as these two blocks are duplicates, it is thought that a description of one will suffice for both.

To this end, each block is of a general rectangular form and plan as shown and opposed sides are beveled inwardly toward each other as at 11. In addition, these inclined or beveled sides are provided with central ribs which serve as locking keys in a manner to be made plain later.

The apex portions are truncated as at 13, and in addition, each block is provided with a socket 14. The remaining two blocks are represented by the reference characters 15 and 16 respectively. Here again, the bodies are of general rectangular form in top plan view and the top and bottom walls are beveled to cooperate with the complemental bevels 11 on the first named blocks 9 and 10. Also, the beveled walls of the blocks 15 and 16 are provided with grooves 17 to slidably receive the key forming ribs 12 on the first named blocks. Moreover, these blocks 15 and 16 are provided with sockets 18 through which bolts 19 extend. The bolts are surrounded at their opposite ends with springs 20 which are located in the sockets and normally project beyond the same, as represented in Figs. 2 and 3.

Directing attention to Fig. 1 it will be seen that the grooves 17 are widened gradually adjacent their outer ends. The purpose of this construction is to provide clearance and free sliding of the ribs in the grooves. Under certain conditions, one side of the vehicle would be on a comparatively low elevation and the other side relatively high. With the ribs and grooves the same width, a binding action would take place, preventing sliding of the ribs. The clearance provided by the curved shape of the side walls of the grooves overcomes this binding.

Attention is now directed to Figs. 5 to 7 inclusive, wherein the other embodiment of the invention is shown. It might be stated here, that there is very little difference in the construction of the two different embodiments, and the foregoing description will suffice to permit an understanding of this embodiment of the invention to be understood.

However, we find that the reference character 21 designates the device in its entirety which, like the other embodiments, is made up of a pair of top and bottom blocks 22 and side blocks 23. These are provided with coacting tongues and grooves and with beveled faces for producing the desired cam action. Moreover, the inner end portions are truncated as represented. The outstanding difference to be noticed here is that instead of having the sockets, these blocks are rather formed with bored holes 24 through which relatively long coiled springs 25 extend.

The outer ends of the springs are provided with retaining pins 26 extending across the holes 24 to hold the springs in place. It might be also stated that the blocks 22 are provided in their opposed truncated apices with semi-circular grooves 27, to accommodate the springs, when the action of the device is rather excessive.

In both constructions, it is obvious that when either set of blocks approach the other, the cam action produced tends to separate the blocks of the other set. However, the presence of the springs yieldably resist the return of the blocks to their normal position. In this way, the shocks and jars which would otherwise be experienced, are substantially eliminated.

It is believed that by carefully considering the drawings in connection with the description, a clear understanding of the invention will be had. Therefore a more lengthy description is thought unnecessary.

Having thus described my invention, what I claim as new is:—

1. In a structure of the class described, in combination, an axle, a vehicle chassis, a block-like body attached to said axle, a second block-like body attached to the chassis at a point above the first named block, connecting means between said bodies, and additional means interposed between the bodies adapted to resist the movement of the bodies toward each other.

2. A shock absorber of the class described comprising top and bottom blocks having their opposed inner faces beveled and terminating in truncated apices, a pair of side blocks interposed between the beveled faces, said side blocks having their upper and lower sides beveled for cooperation with the first named bevels, bolts extending thru said top and bottom blocks, additional bolts extending thru said side blocks, and spring means associated with the bolts and blocks respectively.

In testimony whereof I affix my signature.

JOHN A. HARDING.